United States Patent [19]

Ruffini

[11] Patent Number: 4,776,980

[45] Date of Patent: Oct. 11, 1988

[54] INDUCTOR INSERT COMPOSITIONS AND METHODS

[76] Inventor: Robert S. Ruffini, 31925 Crossbow Ct., Birmingham, Mich. 48010

[21] Appl. No.: 115,442

[22] Filed: Oct. 30, 1987

Related U.S. Application Data

[63] Continuation-in-part of Ser. No. 29,348, Mar. 20, 1987, abandoned, which is a continuation of Ser. No. 876,219, Jun. 19, 1986, abandoned.

[51] Int. Cl.$^4$ .................. H01B 1/02; C08K 3/32; C08K 3/08
[52] U.S. Cl. .................. 252/513; 523/442; 523/451; 523/458; 524/417; 524/440; 336/233
[58] Field of Search .............. 252/513, 519; 523/442, 523/458, 451; 524/417, 440; 336/233; 29/348

[56] References Cited

U.S. PATENT DOCUMENTS

| | | |
|---|---|---|
| 1,274,952 | 8/1918 | Speed . |
| 1,297,126 | 3/1919 | Elmen . |
| 1,634,923 | 7/1927 | Thullen . |
| 1,669,644 | 5/1928 | Andrews . |
| 1,789,477 | 1/1931 | Roseby . |
| 1,960,899 | 5/1934 | de Forest . |
| 1,982,690 | 12/1934 | Polydoroff . |
| 1,994,534 | 3/1935 | Robinson . |
| 2,011,697 | 8/1935 | Vogt . |
| 2,283,925 | 5/1942 | Harvey . |
| 2,354,331 | 7/1944 | Polydoroff . |
| 2,407,234 | 9/1946 | Guthrie et al. . |
| 2,601,212 | 6/1952 | Polydoroff . |
| 2,689,398 | 9/1954 | Gaut et al. . |
| 2,998,840 | 9/1961 | Davis . |
| 3,152,082 | 10/1964 | Davis et al. . |
| 3,848,331 | 11/1974 | Pavlik et al. . |
| 3,948,690 | 4/1976 | Pavlik et al. . |
| 4,502,982 | 3/1985 | Houe et al. .......... 524/440 |
| 4,631,381 | 12/1986 | Delage et al. . |

FOREIGN PATENT DOCUMENTS

| | | |
|---|---|---|
| 15859 | 12/1926 | Netherlands . |
| 243953 | 12/1925 | United Kingdom . |
| 247301 | 2/1926 | United Kingdom . |

*Primary Examiner*—Josephine Barr
*Attorney, Agent, or Firm*—Harness, Dickey & Pierce

[57] ABSTRACT

Disclosed are compositions useful in fabricating blocks or inserts for inductors comprising:

(a) about 98 percent to about 99.5 percent by weight of a high purity, annealed electrolytically prepared iron powder; and (b) about 0.5 percent to about 2 percent of an insulating polymer binder selected from the group consisting of epoxies, flourocarbon, hot melt adhesives, and mixtures thereof;

wherein said iron powder has a specific surface area of less than about 0.25 m$^2$/g and a carbon content of less than about 0.01 percent; and wherein said composition after pressing at at least about 30 Tsi demonstrates a maximum of 5 percent regression in permeability and a total core loss of less than about 0.8 to about 1.2 ohms between 10 KHz and 500 KHz. Blocks and inserts made from such compositions, as well as methods of manufacturing such inserts, are also disclosed.

22 Claims, No Drawings

INDUCTOR INSERT COMPOSITIONS AND METHODS

This application is continuation-in-part of application Ser. No. 029,348, filed Mat. 20, 1987, now abandoned which is a continuation of application Ser. No. 876,219, filed June 19, 1986, now abandoned.

BACKGROUND AND SUMMARY OF THE INVENTION

This invention relates generally to compositions useful in fabricating blocks or inserts for inductors, and more particularly to compositions useful in fabricating blocks or inserts for inductors used in induction heating. The invention also relates to the inductor manufactured using such blocks or inserts, the method of making the composition and the inductor, and the method of employing the inductor in the heat-treatment of workpieces.

Inductors or inductor coils are generally used to heat conductive material by currents induced by varying an electromagnetic field. Electromagnetic energy is transferred from the inductor to a workpiece. For purposes of analogy, if the inductor coil is considered to be the primary winding of a transformer, then the workpiece which is about to be heated would be considered the single-turn secondary. When an alternating current flows in the primary coil or inductor, secondary current will be induced in the workpiece. These induced currents are called eddy currents and the current flowing in the workpiece can be considered as the summation of all of the eddy currents. Heat is generated in the workpiece by hysteresis and eddy current losses, with the heat generated being a result of the energy expended in vvercoming the electrical resistance of the workpiece. Typically, close spacing is used between the inductor coil and the workpiece, and high coil currents are used to obtain maximum induced eddy currents and resulting high heating rates.

Induction heating is widely employed in the metal working industry to heat metals for soldering, brazing, annealing, hardening, forging, induction melting and sintering, as well as for other various induction heating applications. As compared to other conventional processes, induction heating has several inherent advantages. First, heating is induced directly into the material. It is therefore an extremely rapid method of heating. It is not limited by the relatively slow rate of heat diffusion in conventional processes using surface contact or radiant heating methods. Second, because of a skin effect, heating is localized and the area of the workpiece to be heated is determined by the shape and size of the inductor coil. Third, induction heating is easily controllable, resulting in uniform high quality of the product. Fourth, induction heating lends itself to automation, in-line processing, and automatic process cycle control. Fifth, start-up time is short, and thus standby losses are low or nonexistent. And sixth, working conditions are better because of the absence of noise, fumes, and radiated heat. Of course, there are also other advantages.

It is well known that the magnetic flux generated by the inductor must be dense enough to bring the workpiece to a desired temperature in a specified time (typically short). When the workpiece is simple in shape and can easily be surrounded by the inductor, rapid heating using a conventional inductor is a relatively simple task. However, when the workpiece is of a more complex shape, it becomes difficult to assure rapid and uniform heating in areas which are not readily accessible to the inductor.

In the past, it has been recognized that the performance of inductors may be improved by controlling the direction of flux flow and thereby manipulating and maximizing flux density on the workpiece. For example, with an inductor coil of generally circular cross-section, directional control might be improved by attaching magnetic field orienting elements on certain portions of the circumference, so that flux is intensified on the corresponding area of the workpiece. Presently used field orienting elements include laminations made of grain-oriented iron (which are relatively thin pieces of strip stock) which are attached to the inductor on a strip by strip or layer by layer basis as necessary. These laminations, however, are unsatisfactory to the extent that they are difficult to apply, requiring cutting and sizing to the necessary configuration. Thus limited portions or parts of an inductor cannot be covered because of the difficulty of application. In this regard, it is very tedious and difficult to laminate such strip stock on to complicated geometrical shapes of the type which are often needed to heat-treat certain types of workpieces. Applying such laminations to large inductors is also somewhat prohibitive due primarily to cost and labor considerations. In addition, these iron laminations have a tendency to lose permeability at high operating temperatures. This results in inefficient heat treating operations. At high temperatures, these materials require cooling due to relatively high hysteresis and eddy current losses. Laminations made of grain-oriented iron are also relatively expensive due to labor cost required for manufacture.

Another conventional method of controlling the direction of inductor flux density is by the use of blocks or inserts made of ferromagnetic material in a binder. Tetraflouroethylene (TFE) polymers have been used as binders in these blocks or inserts.

Ihe present invention relates to novel and improved compositions useful in the fabrication of such blocks or inserts. These compositions employ a high purity, annealed, electrolytically prepared iron powder with a unique physical characteristic and a polymer binder which includes a resin or mixtures of resins. The compositions may optionally employ an additional material or component such as an acid phosphate insulating coating. Inserts or blocks fashioned from the resulting compositions show improved performance when employed in induction heat treatment modalities over conventional, art-disclosed materials in that the insert formed from these ccmpositions maintains the necessary permeability and demonstrates a maximum of about five (5) percent regression in permeability between the commonly employed frequencies of 10 KHz and 500 KHz and a total core loss of less than about 0.8 to about 1.2 ohms in this range. The iron powder in the compositions and methods of the present invention is characterized in that it is substantially non-spherical and generally flat or disc-shaped and possesses a specific surface area of less than about 0.25 $m^2/g$. The iron powder described above is particularly suited to use in preparing inserts in that it permits the formation of an insert by pressing at relatively high pressures with the insert possessing a very high density with an extremely high ratio of ferromagnetic material: binder material while still permitting the binder to perform well. The present invention also relates to the method of preparing these compositions; the block or insert prepared from these compositions and the method of preparing them; the inductor manufactured employing these blocks or inserts; and the method of heat-treating a workpiece employing these inductors.

DETAILED DESCRIPTION OF THE PRESENT INVENTION

The compositions of the present invention are particularly useful in preparing or fabricating blocks or inserts for inductors. The compositions generally comprise a ferromagnetic material and a binder. The ferromagnetic material is of a specific class and character and possesses select, specific physical properties. The binder employed comprises a plastic resin or mixtures of plastic resins. The final composition may optionally include other components such as an acid phosphate and/or a mold release lubricant and high temperature resistant plastic coatings.

The ferromagnetic material employed in the present invention is a high purity annealed iron powder prepared by electrolytic deposition. The preferred materials have a total carbon content of less than about 0.01 percent and a hydrogen loss of less than about 0.30 percent. In a preferred embodiment, the loose iron powder employed in the compositions of the present invention has an apparent density of greater than about 2.00 grams per cubic centimeter. Preferred materials possess particle sizes wherein a majority of the particles are in the range of about 100 mesh, with less than about 3 percent having a particle size (Tyler) of greater than 100 mesh (i.e., greater than 149 $\mu$m and less than about 44 $\mu$m). Such materials preferably have an average particle size in the range of about 40 to about 70 $\mu$m; most preferably about 50 $\mu$m.

Another important property of the iron powder employed in the compositions and methods of the present invention is the particular shape. High purity annealed electrolytically-produced iron powders described above can be characterized as being predominately non-spherical, disc-shaped materials. While not bound by theory it has now been recognized that this shape produces at least two important advantages. First, the shape allows the use of much higher ratios of ferromagnetic material: binder material than other iron materials frequently employed such as carbonyl iron powders. Secondly, the shape, in combination with the high purity of the class of iron powders employed allows the pressing of blocks or inserts at extremely high levels of pressure, e.g., in the range of from about 30 to 50 Tsi (tons per square inch). It is thought that iron materials previously employed in the art could not be pressed at such high levels of pressure without a significant loss in performance because of the work hardening of the iron which takes place at such extreme pressures. Accordingly, the selective combination of the purity and shape of this iron allows pressing at these high pressures without significant deterioration of performance of the ferromagnetic material. The iron is preferably employed in the composition at a level of from about 90 to about 99.5 percent by weight. Most preferably, iron is employed at a level of from about 98 to about 99.5 percent by weight.

This ferromagnetic material is incorporated into the compositions of the present invention in combination with a polymer binder which comprises a polymeric resin or mixture of resins. Typical of the preferred resins are resins of the nylon, flourocarbons, epoxy and hot melt adhesive types or classes. These are generally characterized by their ability to provide excellent particle-to-particle insulation after pressing. Preferred resins include epoxy resins such as epoxy powder resins sold by the 3M Corporation as "Scotchcast Electrical Resins". Another preferred binder is a flourocarbon binder such as the fluorinated ethylene propylene material sold by LNP Corporation of Malvern, Pa. as the TL 120 series. The flourocarbon binders have been found to be advantageous in the compositions of the present invention due to the relative inertness of the composition employing these binders. The flourocarbon binders, when employed in the composition, also provide a higher temperature resistance and better insulating properties in the final product.

The binder is preferably employed at a level of about 0.5 to about 10 percent, and more preferably about 0.5 to about 2 percent by weight of the final product. In a highly preferred embodiment, the binder is present at a level of about one-half to about one percent by weight of the final product.

In a preferred composition suitable for use at low frequencies of from about 60 KHz to about 50 KHz a level of about 98 percent iron and about 2 percent binder may be employed. In a preferred composition suitable for use at higher radio frequencies of from about 50 KHz to about 500 KHz with a level of about 92 percent iron to about 8 percent binder may be employed.

Other materials may be optionally employed in the compositions and methods of the present invention. For example, an insulating material may be employed. In general, the insulating material includes those conventionally employed in the art. Preferred materials include acid phosphates; phosphoric acid ($H_3PO_4$) is particularly preferred as an insulating material and is present in an amount of about 0.1 to about 1 percent based on the composition.

Another preferred optional material is a mold release agent or lubricant. In general, these may be selected from those materials conventionally employed in the art. Preferred mold release agents to be employed in the compositions and methods of the present invention include the metallic salts or fatty acids. Zinc stearate is a particularly preferred mold release agent for use in the composition and methods of the present invention.

The compositions may be prepared by conventional techniques well known in the art. A preferred method generally comprises mixing the dry iron metal powder in a premixed solution of an evaporable solvent such as a hydrocarbon and a binder. The combination is then admixed until it appears dry. The powder is then further dried at a temperature above ambient room temperature, preferably about 120 degrees and about 140 degrees F. The resulting composition is next pressed or cast into blocks or inserts at a pressure of about 30 to about 50 Tsi. Following pressing, the block or insert is further cured at an elevated temperature, i.e., about 150 degrees to about 500 degrees F. until completely cured.

In another embodiment, a phosphate coating is applied to the dry metal powders by mixing the phosphate composition into an evaporable solvent. Then, after drying, the coated metal particles will be processed as stated above, i.e., the coated particles mixed with the evaporable solvent and binder. The phosphate coating acts as an insulator for the particles. Alternatively, the use of the evaporable solvent prior to the addition of the binder can be omitted as the binder may be fixed in the sintering stage.

As noted, the composition can be pressed and cured into a block shape or into the shape of the desired insert. If pressed into a block shape, the material may be readily machined into the desired shape to conform to the surface of the inductor or workpiece or other desired shape by using common or conventional tools such as a grinding wheel, sand paper, and the like.

The blocks may be machined or pressed into any geometric shape and size. For example, the compositions and inserts or blocks made therefrom may be used to form an insert having a square, rectangular, torroidal, circular, or any other shape required to concentrate the "flux field" or "magnetic field" to the appropriate situs on the workpiece. They may also be employed to form an insert which can direct, redirect or block the field. The resulting compositions and inserts or blocks made therefrom may also be employed to stop, shield or hold magnetic fields emanating from the source and heating equipment or the workpiece at an undesirable situs.

The machined or precast insert may be affixed to the desired surface of the inductor in any convenient fashion. Preferably, the machined or precast insert is affixed using an adhesive such as those selected from the silicone or epoxy types or classes. A preferred adhesive would be commercial silicone rubber cement or a commercial epoxy adhesive.

EXAMPLE

Employing a beaker, 100 grams of a high purity, annealed electrolytically prepared iron powder is added to a beaker with about 1 gram of an 85 percent phosphoric acid solution. Next, about 350 milliliters of acetone is added to thoroughly wet the powder and to produce a slurry. The ingredients are thoroughly and continuously admixed with a spatula until the powder appears dry and looks much the same as when you began. Next, the powder is allowed to dry for about one-half hour at a temperature of about 120 degrees F. to about 140 degrees F.

After, drying, about 1 gram of the polymeric binder predissolved in a solvent such as acetone is mixed as above and the drying is repeated. Lastly, a mold release agent such as zinc stearate is admixed with the powder produced above. It is added at a level of about 0.1 percent to about 1 percent.

A precast torroidal insert is formed by placing the produced powder in a torroidal-shaped mold and pressing it at between about 30 and about 50 Tsi. Following pressing, the resulting insert is allowed to cure for about one-half hour at about 500 degrees F. When cool, the flashing is sanded and the insert is ready for use.

The above example has been included to further illustrate the benefits and advantages of the present invention. It will be understood that the example is provided for illustrative purposes only and is not intended to limiting of the scope of the invention as disclosed herein.

What is claimed is:

1. A composition useful in fabricating blocks or inserts for inductors comprising:
   (a) about 98 percent to about 99.5 percent by weight of a high purity, annealed electrolytically prepared iron powder; and
   (b) about 0.5 percent to about 2 percent of an insulating polymer binder;
   wherein said iron powder has a specific surface area of less than about 0.25 $m^2$/g and a carbon content of less than about 0.01 percent; and
   wherein said composition after pressing at at least about 30 Tsi demonstrates a maximum of 5 percent regression in permeability and a total core loss of less than about 0.8 to about 1.2 ohms between 10 KHz and 500 KHz.

2. A composition according to claim 1 wherein the polymer binder is selected from the group consisting of flourocarbons, epoxies, hot melt adhesives, and mixtures thereof.

3. A composition according to claim 1 wherein the polymer binder is an epoxy.

4. A composition according to claim 1 wherein the polymer binder is a hot nelt adhesive.

5. A composition according to claim 1 wherein the polymer binder is a flourocarbon.

6. A composition according to claim 5 wherein the polymer binder is a fluorinated ethylene propylene.

7. A composition according to claim 1 wherein the binder is a nylon.

8. A composition according to claim 1 which additionally comprises about 0.1 to about 1 percent acid phosphate.

9. A composition according to claim 1 wherein said iron powder is substantially disc-shaped.

10. A composition according to claim 1 wherein said pressed iron powder has a hydrogen loss of less than about 0.30 percent prior to addition to the composition.

11. A composition according to claim 1 wherein the iron powder has an average particle size in the range of about 40 to about 150 um.

12. A composition according to claim 11 wherein the iron powder has an average particle size of about 40 to about 70 um.

13. An insert for an inductor of the like manufactured by pressing and curing a composition according to claim 1.

14. A composition useful in fabricating blocks or inserts for inductors comprising:
   (a) about 98 percent to about 99.5 percent by weight of a high purity, annealed electrolytically prepared iron powder; and
   (b) about 0.5 percent to about 2 percent of an insulating polymer epoxy resin binder;
   wherein said iron powder has a specific surface area of less than about $0.25^2$/g and a carbon content of less than about 0.01 percent; and
   wherein said composition after pressing at at least about 30 Tsi demonstrates a maximum of 5 percent regression in permeability and a total core loss of less than about 0.8 to about 1.2 ohms between 10 KHz and 50 KHz.

15. A composition useful in fabricating blocks or inserts for inductors comprising:
   (a) about 98 percent to about 99.5 percent by weight of a high purity, annealed electrolytically prepared iron powder; and
   (b) about 0.5 percent to about 2 percent of an insulating flourocarbon polymer binder;
   wherein said iron powder has a specific surface area of less than about $0.25^2$/g and a carbon content of less than about 0.01 percent; and
   wherein said composition after pressing at at least about 30 Tsi demonstrates a maximum of 5 percent regression in permeability and a total core loss of less than about 0.8 to about 1.2 ohms between 10 KHz and 50 KHz.

16. A method of preparing a block or insert for conductors comprising:
   (a) preparing a premix comprising an evaporable solvent, a polmer binder and a high purity, annealed electrolytically prepared iron powder;
   (b) substantially drying the product of step (a);
   (c) forming an insert from said substantially dried composition at a pressure of about 30 to about 50 Tsi; and
   (d) curing the formed insert at an elevated temperature of about 150 to about 500 degrees F.

17. A fabricated block or insert prepared by a process according to claim 11.

18. A method according to claim 16 wherein the binder is selected from the group consisting of epoxies, flourocarbons, hot melt adhesives, and mixtures thereof.

19. A method according to claim 18 wherein the binder is an epoxy.

20. A method according to claim 18 wherein the binder is a hot melt adhesive.

21. A method according to claim 18 wherein the binder is a fluorinated ethylene propylene.

22. The method according to claim 18 wherein the binder is a fluorinated ethylene propylene material.

* * * * *

UNITED STATES PATENT AND TRADEMARK OFFICE
CERTIFICATE OF CORRECTION

PATENT NO. : 4,776,980

DATED : October 11, 1988

INVENTOR(S) : Robert S. Ruffini

It is certified that error appears in the above-identified patent and that said Letters Patent is hereby corrected as shown below: ON THE TITLE PAGE:

References Cited:
  U.S. Patent Documents "Houe et al" should be --Horie et al--.

In the Abstract, line 14, delete "at" second occurrence.

Column 1, line 6, "Mat." should be --Mar.--.

Column 1, line 35, "vver" should be --over--.

Column 5, line 59, insert --be-- before "limiting".

Column 6, line 4, claim 1, delete "at" second occurrence.

Column 6, line 16, claim 4, "nelt" should be --melt--.

Column 6, line 51, claim 14, delete "at" second occurrence.

Column 6, line 66, claim 15, delete "at" second occurrence.

Column 7, line 6, claim 16, "polmer" should be --polymer--.

Signed and Sealed this

Twelfth Day of January, 1993

Attest:

DOUGLAS B. COMER

*Attesting Officer*  *Acting Commissioner of Patents and Trademarks*